US010563787B2

United States Patent
Yates et al.

(10) Patent No.: US 10,563,787 B2
(45) Date of Patent: Feb. 18, 2020

(54) ELECTRIC ACTUATOR SYSTEM AND METHOD

(71) Applicant: GE Oil & Gas Pressure Control LP, Houston, TX (US)

(72) Inventors: Chad Yates, Houston, TX (US); Milind Appasaheb Ghumre, Bangalore (IN)

(73) Assignee: GE Oil & Gas Pressure Control LP, Houston, TX (US)

( * ) Notice: Subject to any disclaimer, the term of this patent is extended or adjusted under 35 U.S.C. 154(b) by 29 days.

(21) Appl. No.: 15/686,735

(22) Filed: Aug. 25, 2017

(65) Prior Publication Data

US 2018/0058602 A1 Mar. 1, 2018

Related U.S. Application Data

(60) Provisional application No. 62/379,359, filed on Aug. 25, 2016.

(51) Int. Cl.
*F16K 31/04* (2006.01)
*F16K 3/02* (2006.01)
(Continued)

(52) U.S. Cl.
CPC ............ *F16K 31/042* (2013.01); *F16D 41/12* (2013.01); *F16D 67/02* (2013.01); *F16H 1/46* (2013.01);
(Continued)

(58) Field of Classification Search
CPC .... F16K 31/042; F16K 3/0254; F16K 31/047; F16K 31/508; F16K 31/046; F16D 67/02;
(Continued)

(56) References Cited

U.S. PATENT DOCUMENTS 1,782,572 A * 11/1930 Janda ...................... F16D 11/04
192/28
2,930,571 A * 3/1960 Vogl ...................... F16K 31/047
251/129.12
(Continued)

FOREIGN PATENT DOCUMENTS

WO 2006/052749 5/2006
WO WO 2014/173422 A1 * 10/2014

OTHER PUBLICATIONS

"Fail-safe Actuators: When Failure Is Not an Option", ICI's Actuator & Valve Industry Blog, Retrieved from Internet URL: http://blog.indelac.com/when-failure-is-not-an-option-fail-safe-actuators, on May 25, 2018, pp. 1-6 (Jun. 2, 2014).
(Continued)

*Primary Examiner* — John Bastianelli
(74) *Attorney, Agent, or Firm* — Hogan Lovells US LLP (57) ABSTRACT

An actuator with a motor produces a motive force to control a valve. The actuator includes a driving portion coupled to the motor to receive the motive force from the motor. Additionally, the actuator includes a driven portion coupled to the driving portion, the driven portion being coupled to a valve stem to drive movement of the valve between at least one of an open position and a closed position. The actuator includes a clutch positioned between the driving portion and the driven portion, the clutch being a one-way clutch to transmit motive force from the driving portion to the driven portion and block transmission of the motive force from the driven portion to the driving portion. Additionally, the actuator includes a brake arranged proximate the clutch to stop transmission of the motive force between the driving portion and the driven portion.

7 Claims, 9 Drawing Sheets

(51) Int. Cl.
*F16D 41/12* (2006.01)
*F16D 67/02* (2006.01)
*F16H 1/46* (2006.01)
*F16H 37/04* (2006.01)
*F16H 37/06* (2006.01)
*F16K 31/50* (2006.01)

(52) U.S. Cl.
CPC ......... *F16H 37/041* (2013.01); *F16H 37/065* (2013.01); *F16K 3/0254* (2013.01); *F16K 31/046* (2013.01); *F16K 31/047* (2013.01); *F16K 31/508* (2013.01)

(58) Field of Classification Search
CPC .......... F16D 41/12; F16H 1/46; F16H 37/065; F16H 37/041
USPC ........................................................ 251/230
See application file for complete search history.

(56) References Cited

U.S. PATENT DOCUMENTS

| | | | | |
|---|---|---|---|---|
| 3,258,985 | A | * | 7/1966 | Jordan ................ F16K 31/047 251/129.12 |
| 3,493,170 | A | * | 2/1970 | Hirofumi ................ A62B 7/00 251/250 |
| 3,704,853 | A | * | 12/1972 | Waller ................ F16K 31/047 192/18 B |
| 3,785,465 | A | * | 1/1974 | Johansson ............ B27B 17/083 192/104 C |
| 3,989,223 | A | | 11/1976 | Burkhardt et al. |
| 4,246,994 | A | | 1/1981 | Staedeli |
| 4,274,523 | A | * | 6/1981 | Sigg ........................ F16D 23/10 192/21 |
| 4,367,813 | A | * | 1/1983 | Wieland ............... B27B 17/083 192/17 R |
| 5,182,498 | A | * | 1/1993 | Stuhr ....................... F16H 3/72 185/40 R |
| 5,195,721 | A | * | 3/1993 | Akkerman ............. F16K 31/04 192/56.1 |
| 6,488,260 | B1 | | 12/2002 | Dietz |
| 6,595,487 | B2 | | 7/2003 | Johansen et al. |
| 6,899,171 | B2 | | 5/2005 | Biester et al. |
| 6,981,428 | B2 | | 1/2006 | Donald et al. |
| 7,523,916 | B2 | | 4/2009 | Fenton |
| 8,716,963 | B2 | | 5/2014 | Biester et al. |
| 8,973,451 | B2 | | 3/2015 | Oswald |
| 9,163,484 | B2 | | 10/2015 | Biester et al. |
| 2004/0135112 | A1 | * | 7/2004 | Greeb .................. F16K 31/046 251/214 |
| 2005/0029476 | A1 | * | 2/2005 | Biester ................. F16K 31/046 251/58 |
| 2005/0247900 | A1 | | 11/2005 | Marsh et al. |
| 2006/0021840 | A1 | | 2/2006 | Kimes et al. |
| 2009/0015088 | A1 | * | 1/2009 | Akopian ................ F16D 11/10 310/99 |
| 2010/0308240 | A1 | | 12/2010 | McAdoo et al. |
| 2016/0153580 | A1 | | 6/2016 | Lenz |

OTHER PUBLICATIONS

Winther-Larssen, E. H., "Design of an Electric X-mas Tree Gate Valve Actuator," in Master of Science in Engineering Cybernetics, NTNU, pp. 1-127 (Jun. 2007).
International Search Report and Written Opinion issued in connection with corresponding PCT Application No. PCT/US2017/048767 dated Jan. 12, 2018.
Ghumre, M.A., et al., Fail Safe Electric Actuator, Ge Co-Pending U.S. Appl. No. 62/514,567, filed Jun. 2, 2017.
"IFOKUS / OCENEERING_Linear Electric Failsafe Actuators" http://www.oceaneering.com/2517/oceaneering-acquires-ifokus-engineering-as/ & https://oceaneering.no/products-and-services/subsea-all-electric/subsea-electrical-actuation/linear-anti-surge-actuator.aspx & https://oceaneering.no/media/3111930/ab6607%20-%linear%20anti%20surge%20actuator%20-%20212-04-.

* cited by examiner

ELECTRIC ACTUATOR SYSTEM AND METHOD

CROSS-REFERENCE TO RELATED APPLICATIONS

This application claims benefit of U.S. Provisional Application No. 62/379,359 filed Aug. 25, 2016 entitled "FAIL SAFE ELECTRIC ACTUATOR" which is incorporated by reference in its entirety.

BACKGROUND

1. Field of Invention

This disclosure relates in general to linear actuators, and in particular, to systems and methods for the conversion of rotational movement into linear and/or rotational movement.

2. Description of the Prior Art

Valves may be utilized to regulate a flow of a fluid in industries such as oil and gas production and refining, special chemical refining, power generation, water treatment, and the like. Often, these valves may include actuators to facilitate opening and closing of the valves. In certain situations, the valves may be linear valves, such as gate valves, that translate a stem linearly along an axis to move a gate between an open position where a bore of the valve is unrestricted, a closed position where the bore of the valve is blocked, and positions in between. These actuators may be electrically or hydraulically driven and provide faster opening and closing than manual operation, automate operation to keep personnel away from potentially hazardous environments, and apply greater torque to enable opening and closing in high pressure situations. Typical actuators may have a large footprint to accommodate motors, gears, pumps, and the like in order to generate the torque utilized to open valves in certain high pressure scenarios. Additionally, these valves often undergo maintenance operations due to the high forces experienced during cycling. It is now recognized that improved actuators are desirable.

SUMMARY

Applicants recognized the problems noted above herein and conceived and developed embodiments of systems and methods, according to the present disclosure, for linear actuators.

In an embodiment a system for controlling movement of a valve includes a valve end moveable between an open position and a closed position, wherein the valve end is within a flow bore of the valve in the closed position and substantially clear of the flow bore in the open position. The system also includes a stem coupled to the valve end and driving movement of the valve end. The system further includes an actuator coupled to the stem, the actuator controlling movement of the valve end via the stem. The actuator includes a motor arranged within an actuator housing, the motor providing a rotational force to drive movement of the stem. The actuator also includes a driving portion including a gear drive to receive and transmit the rotational force from the motor. Additionally, the actuator includes a driven portion receiving the rotational force from the driving portion, the driven portion being coupled to the stem. The actuator further includes a clutch arranged between the driving portion and the driven portion, the clutch transmitting the rotational force from the driving portion to the driven portion and being disengageble from the driven portion.

In another embodiment an actuator includes a motor producing a motive force to control a valve. The actuator also includes a driving portion coupled to the motor to receive the motive force from the motor, the driving portion including at least one gear drive to adjust a gear ratio of the motor. Additionally, the actuator includes a driven portion coupled to the driving portion, the driven portion being coupled to a valve stem to drive movement of the valve between at least one of an open position and a closed position. The actuator further includes a clutch positioned between the driving portion and the driven portion, the clutch being a one-way clutch to transmit motive force from the driving portion to the driven portion and block transmission of the motive force from the driven portion to the driving portion. Additionally, the actuator includes a brake arranged proximate the clutch to stop transmission of the motive force between the driving portion and the driven portion.

In an embodiment, a drive train assembly for controlling a valve includes a first motor for supplying a motive force. The drive train assembly also includes a second motor for supplying the motive force. Additionally, the drive train assembly includes a first driving portion coupled to the first motor and having at least one gear ratio. The drive train assembly also includes a second driving portion coupled to the second motor and having at least one gear ratio. Moreover, the drive train assembly includes a driven portion arranged to receive the motive force from the first driving portion or the second driving portion. Also, the drive train assembly includes a clutch coupling the driven portion to the first driving portion and the second driving portion, the clutch transmitting motive force from one of the first driving portion or the second driving portion during operation of the drive train assembly.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure include systems and methods for transitioning valves between open and closed positions. In certain embodiments, an electric actuator is coupled to a valve to provide linear movement to a valve stem to move the valve between an open position and a closed position. The electric actuator may provide motive power via one or more motors, which may operate in a rotational manner, and thereafter convert the rotational motion to a linear motion, for example, via a ball screw. Embodiments of the present disclosure include a drive train assembly having one or more gear drives to multiply a gear ratio of the one or more motors to provide sufficient torque to transition the valve between the open and closed positions. In certain embodiments, the drive train assembly includes a one-way clutch to separate the drive train assembly into a driving portion and a driven portion. Upon moving the valve from the closed position to the open position, the clutch may disengage from the driving portion, which includes the motor in certain embodiments, to thereby block transition of rotational movements applied to the driven portion from being transmitted to the driving portion. In this manner, wear on the motors may be reduced.

Embodiments of the present disclosure include a valve, for example a gate have, having a translatable stem driven by an actuator. The gate is positioned to move between an open and closed position to either block or enable flow through a bore of the valve. In certain embodiments, the actuator is an electric actuator that utilizes one or more drive train assemblies to transmit force from a motor (e.g., an electric motor) to drive linear movement of the stem and thereby the gate. In certain embodiments, the actuator includes a fail-safe spring assembly having a spring that is coiled about the stem. As the gate is transitioned to the open position via axial movement of the stem, the spring may be compressed and store energy to drive the gate toward the closed position. Accordingly, the valve may be referred to as a fail closed valve. In certain embodiments, for example when there is no or little pressure in the bore, the spring force may be sufficient to close the valve by moving the gate to the closed position. In other embodiments, the spring force in combination with pressure in the bore may move the gate to the closed position. In this manner, the valve may be cycled between open and closed positions to permit or block flow through the bore.

Embodiments of the present disclosure, as will be described herein, include the actuator having one or more motors to drive the gate from the closed position to the open position via translated axial movement of the stem along the axis. In certain embodiments, the one or more motors may be coupled various motor stages to either multiply the gear ratio associated with the one or more motors and/or to convert the rotational movement of the motor into a linear force to drive the stem axially along the axis. In embodiments, the one or more motors may include redundancies such that only one motor of the one or more motors operates at a given time. In this manner, the longevity of the actuator may be improved because instead of including a single driving mechanism to control movement of the stem, a backup or redundant driving mechanism may be utilized to decrease the time associated with preventative maintenance on the actuator.

Figure 1:
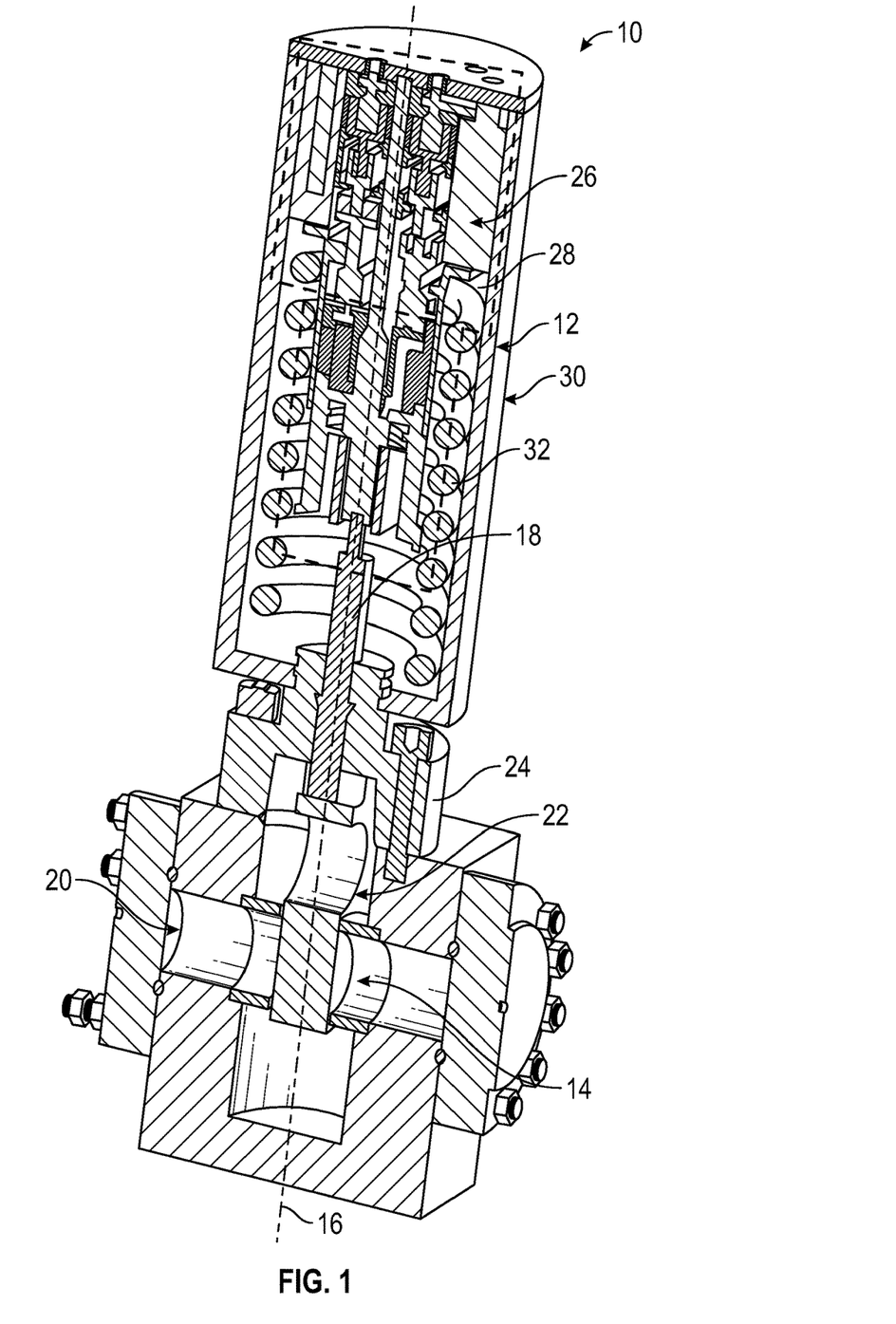
FIG. 1 is a sectional isometric view of an embodiment of a valve having an electric actuator, in accordance with embodiments of the present disclosure.

Embodiments of the present disclosure may also include a clutch positioned in the drive train assembly to divide the drive train into a driving portion and a driven portion. In embodiments, the driving portion includes the one or more motors. The driving portion may also include one or more stages including gears to transmit the rotational force of the motor. In embodiments, the clutch is a one-way clutch that disengages from the driving portion when the valve is in the open position to thereby block transmission of rotational forces applied to the driven portion from being transferred to the driving portion. For example, the clutch may be a centrifugal or star clutch that activates one or more pawl ratchets into engagement with a hub. The hub thereafter transmits rotational movement to the driven portion. In embodiments, the star clutch includes a star drive that has a limited rotational span via one or more pivots engaged with one or more pins. As a drive shaft, powered by the one or more motors, rotates the one or more pins may be moved into engagement with the one or more pivots to transmit rotational movement to the driven hub. To disengage, the one or more motors may reverse the direction of the drive shaft for at least a portion of a rotation to remove the pins from activation with the pivots. As a result, rotational forces applied to the driven portion are not transmitted to the driving portion. That is, the pawl ratchets disengage from the driven hub such that rotational movement of the driven hub has no effect on the pawl ratchets FIG. 1 is a sectional isometric view of an embodiment of a valve 10 having an electric actuator (e.g., actuator) 12. The illustrated valve 10 is a gate valve having a gate 14 that is movable along an axis 16 via a stem 18 that is driven axially along the axis 16 via the actuator 12. The valve 10 includes a bore 20 extending therethrough. In the illustrated embodiment, the valve 10 is in a closed position because the gate 14 is blocking flow through the bore 20. In an open position (not pictured) an opening 22 in the gate 14 would be substantially aligned with the bore 20 to enable flow through the bore 20, for example, flow of a fluid (e.g., liquid, gas, solid, or a combination thereof). The illustrated actuator 12 is coupled to the valve 10 via a bonnet 24 and drives movement of the gate 20 via a connection to the stem 18.

The illustrated actuator 12 is an electric linear actuator that converts rotational movement, such as rotation of a motor, into linear movement of the stem 18, as will be described herein. The actuator 12 includes a drive train assembly 26 that houses one or more motors, as will be described below. Furthermore, a spring retainer 28 is arranged within an actuator housing 30 proximate the drive train assembly 26 to hold a spring 32 circumferentially positioned about the stem 18. In the illustrated embodiment, as the valve moves from the closed position (illustrated) to the open position (not illustrated), the spring 32 will be compressed, thereby storing energy that acts to drive the gate 14 back toward the closed position. In certain embodiments, the energy stored by the spring 32 may be sufficient to close the valve 10, for example, in embodiments where there is little to no pressure in the bore 20. In other embodiments, the pressure in the bore 20 coupled with the spring energy may be utilized to drive the valve 10 toward the closed position. In certain embodiments, this system may be referred to as a "fail safe spring assembly" or a "fail closed" valve.

Figure 2:
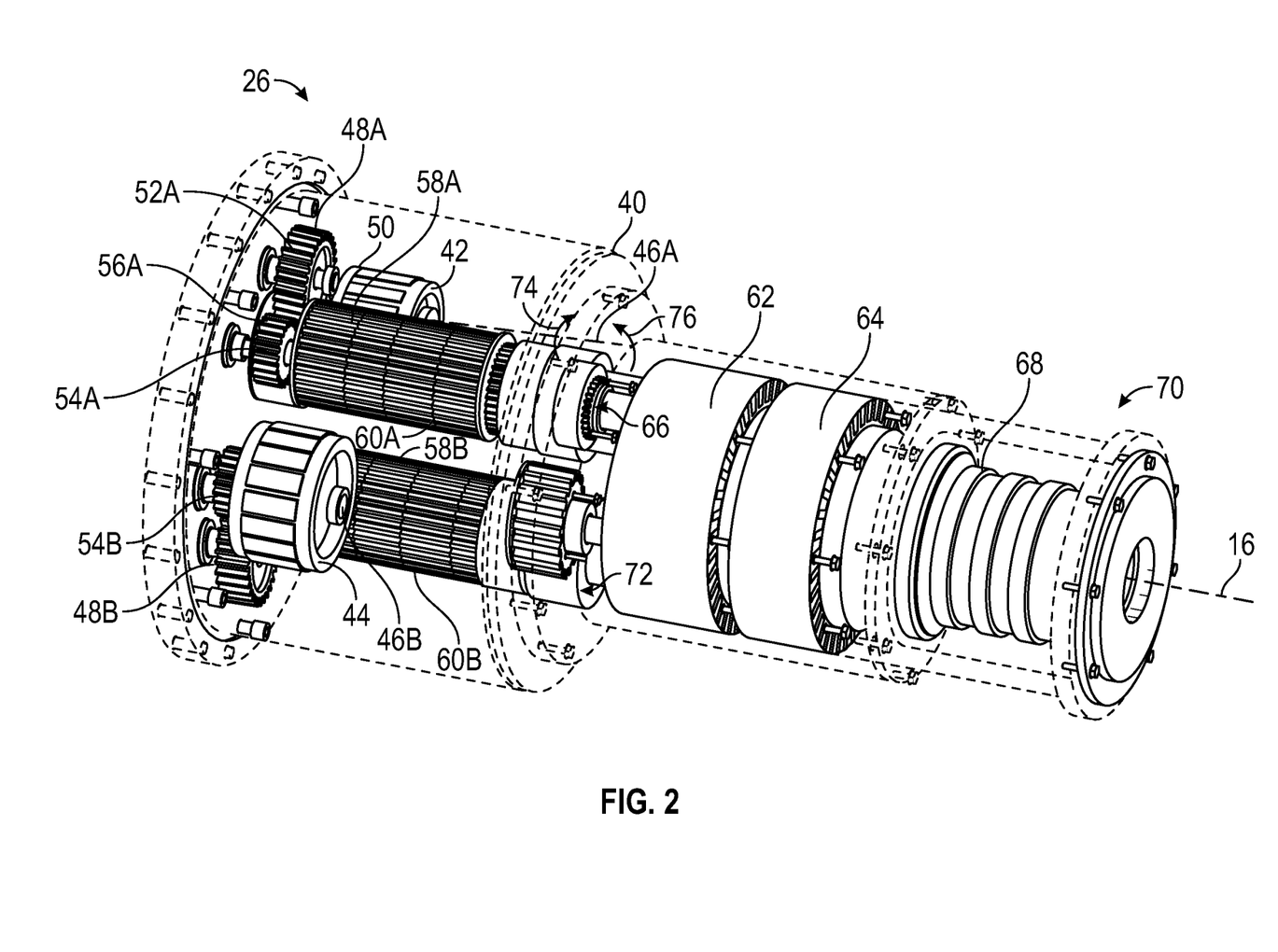
FIG. 2 is an isometric view of an embodiment of a drive train assembly, in accordance with embodiments of the present disclosure.

FIG. 2 is a perspective view of an embodiment of the drive train assembly 26. It should be appreciated that a cover 40 is shown as semi-transparent for clarity and to facilitate discussion of the components of the drive train assembly 26. Furthermore, certain components have been removed for clarity. The illustrated drive train assembly 26 includes a first motor 42 and a second motor 44 for generating the motive power for driving the stem 18 axially along the axis 16. It should be appreciated that while the motors 42, 44 are shown in the illustrated embodiment that other mechanisms for providing motive power, such as turbines or the like may also be utilized within the scope of the present disclosure. The illustrated motors 42, 44 are electric motors (e.g., brushless DC motors, permanent magnet motors, synchronous electric motors, etc.) that rotate about a respective motor axis 46. In certain embodiments, the motors 42, 44 are positioned and operated such that only one motor of the motors 42, 44 is operated at a given time. For instance, in embodiments, the first motor 42 may be utilized to provide motive power to move the stem 18 while the second motor 44 is a backup motor that is utilized in the event a problem arises with the first motor 42. By using the pair of motors 42, 44, the time for maintenance on the actuator 12 may be reduced because when one motor is worn or at end of life, the other redundant motor may be utilized to increase the longevity of the actuator 12. Moreover, it should be appreciated that in certain embodiments one or more controllers (not illustrated) may be coupled to the motors 42, 44 to transmit operating instructions, receive signals from sensors associated with the motors 42, 44 indicative of operating conditions, or the like.

In the illustrated embodiment, the motors 42, 44 rotate about their respective motor axis 46 and transmit the rotational force associated with movement of the motors 42, 44 to one or more stages, which may include gears or be referred to as a gear drive, to convert the rotational movement to linear movement. Furthermore, as will be described below, the drive train assembly 26 may also include breaks and/or a clutch associated with the one or more stages. In the embodiment shown in FIG. 2, each of the stages of the gear drive can have a gear ratio in the range of 0.5:1 to 4:1 so that the overall gear ratio can be in a range of 150:1 to 200:1. In certain embodiments, the number of stages of the gear drive can be more or less than six, and can be arranged in alternate manners to arrive at an overall gear ratio in a desired range.

For clarity, components associated with the first motor 42 may be delineated with an "A" and components associated with the second motor 44 may be delineated with a "B". As shown in FIG. 2, the first motor 42 is movably coupled to a first stage 48A. That is, movement or forces generated by the first motor 42 may be transmitted to the first stage 48A. The illustrated coupling is made via external threads 50 on the first motor 42 and external threads 52A on the first stage 48A. As a result, rotational movement of the first motor 42 is transmitted to the first stage 48A. The first stage 48A is movably coupled to a second stage 54A via the external threads 52A and external threads 56A on the second stage 54A. A similar configuration is also illustrated with respect to components associated with the second motor 44.

The drive train assembly 26 illustrated in FIG. 2 also includes a third stage 58, a fourth stage 60, a fifth stage 62, and a sixth stage 64. As shown, the third stage 58A is coupled to the second stage 54A, the fourth stage 60A and the fifth stage 62 and sixth stage 64 via a clutch 66. In the illustrated embodiment, the third and fourth stages 58, 60 are planetary gear stages, with certain components removed in the illustrated embodiment for clarity. As would be known by one skilled in the art, planetary gears include two gears mounted so that one gear revolves about another. It should be appreciated that, in certain embodiments, the respective gears associated with the gear drive of the drive train assembly 26 may be DLC coated to provide increased wear resistance and thus improve gear life. Accordingly, as shown in FIG. 2, rotational movement of the first motor 42A is transferred through the gear stages (e.g., stages 1 through 4) to the clutch 66. In certain embodiments, as will be described below, the clutch 66 is a one-way clutch that engages quickly when the motors 42, 44 rotate but also disengages such that rotation in an opposite direction is not transmitted back to the motors 42, 44.

In the illustrated embodiment, the fifth stage 62 includes an internal gear, which may receive a pinion associated with each of the motors 42, 44 to receive rotational movement via engagement with the clutch 66. Furthermore, the sixth stage 64 may be a planetary gear system that receives rotational movement from the fifth stage 62 through a pinion gear. The sixth stage 64 is coupled to a ball screw nut 68 associated with a ball screw 70. For example, a planetary carrier of the sixth stage 64 may be directly coupled to the ball screw nut 68. Rotation of the ball screw nut 68 drives the ball screw 70 in an axial direction, which may be coupled to the stem 18, thereby converting the rotational movement of the motors 42, 44 into axial movement to drive the stem 18 along the axis 16. In embodiments, the ball screw nut 68 is constrained from rotation by means of a torque arm and therefore can only move linearly in forward and backward directions. It should be appreciated that while the illustrated embodiment includes the ball screw nut 68 and the ball screw 70, any rotary to linear movement converter may be utilized such as a scotch yoke, rack and pinion, or the like.

The illustrated drive train assembly 26 also includes a brake 72 arranged proximate the clutch 66. In certain embodiments, idler pins extending between the fourth stage 60 and the fifth stage 62 are connected to the brake 72. In certain embodiments, the break engages only after the pinion has come to a complete stop. Additionally, in embodiments, the brake 72 is engaged when the clutch 66 is disengaged, thereby blocking the transmission of rotation from the fifth and sixth stages 62, 64 back toward the motors 42, 44. In certain embodiments, the brake 72 is an electromagnetic brake. The brake 66 may be electrically powered and configured such that a power failure will release the brake 66 and further enable the spring 32 to drive the gate 14 to the closed position. It should be appreciated that, in certain embodiments, the brake 66 may include a latching solenoid and a capacitor that stores sufficient power to trigger the latching solenoid to release the brake 66. In embodiments, power failures may be configured to cause the power stored in the capacitor to trigger the latching solenoid to release the brake. In embodiments, the latching solenoid includes a permanent magnet or residual magnet which does not utilize external power consumption while the valve 10 is in the closed position.

As illustrated in FIG. 2, the clutch 66 is positioned in order to protect the motors 42, 44 and to allow for fast closing and/or opening of the valve 10. The clutch 66 enables rotation by the motors 42, 44 to drive the various stages (e.g., the fifth and sixth stages 62, 64) after the clutch, but also enable the stages after the clutch to rotate in either direction without applying a rotation to the gears before the clutch and therefore without applying a rotational force to the motors 42, 44. For example, the first motor 42 may rotation in a first direction 74 about the motor axis 46A. In the illustrated embodiment, the first direction 74 is in the clockwise direction, but it should be appreciated that the first direction 74 may be in the counter-clockwise direction in other embodiments. Rotation of the first motor 42 in the first direction 74 is transmitted to the first stage 48A, which will rotate in a second direction 76, illustrated as counter-clockwise in the illustrated embodiment. The rotation of the first stage 48A is transmitted to the second stage 54A, which will rotate in the first direction 74 and so forth. In certain embodiments, when the gate 14 is moved toward the closed position and the stem 18 is axially translated toward the motors 42, 44, the fifth stage 62 and the sixth stage 64 may be driven to rotate in the second direction 76, that is, in a direction opposite the first direction 74 and the motor. It should be appreciated that valve 10 may be closed very quickly, and sometimes more than ten times faster than the time to open the valve, and therefore transmitting the rapid rotation back to the motors 42, 44 may lead to damage to components and reduced longevity. Accordingly, utilizing the one-way clutch 66 that disengages from the fourth stage 60 such that rotation is not transmitted back to the motors 42, 44 improves operation of the drive train assembly 26 and may reduce the likelihood of failure or damage to the motors 42, 44. It should be appreciated that in certain embodiments, the components upstream (e.g., to the left relative to the plane of the page) of the clutch 66 may be referred to as the driving portion while the components downstream (e.g., to the right relative to the plane of the page) of the clutch 66 may be referred to as the driven portion.

Figure 3:
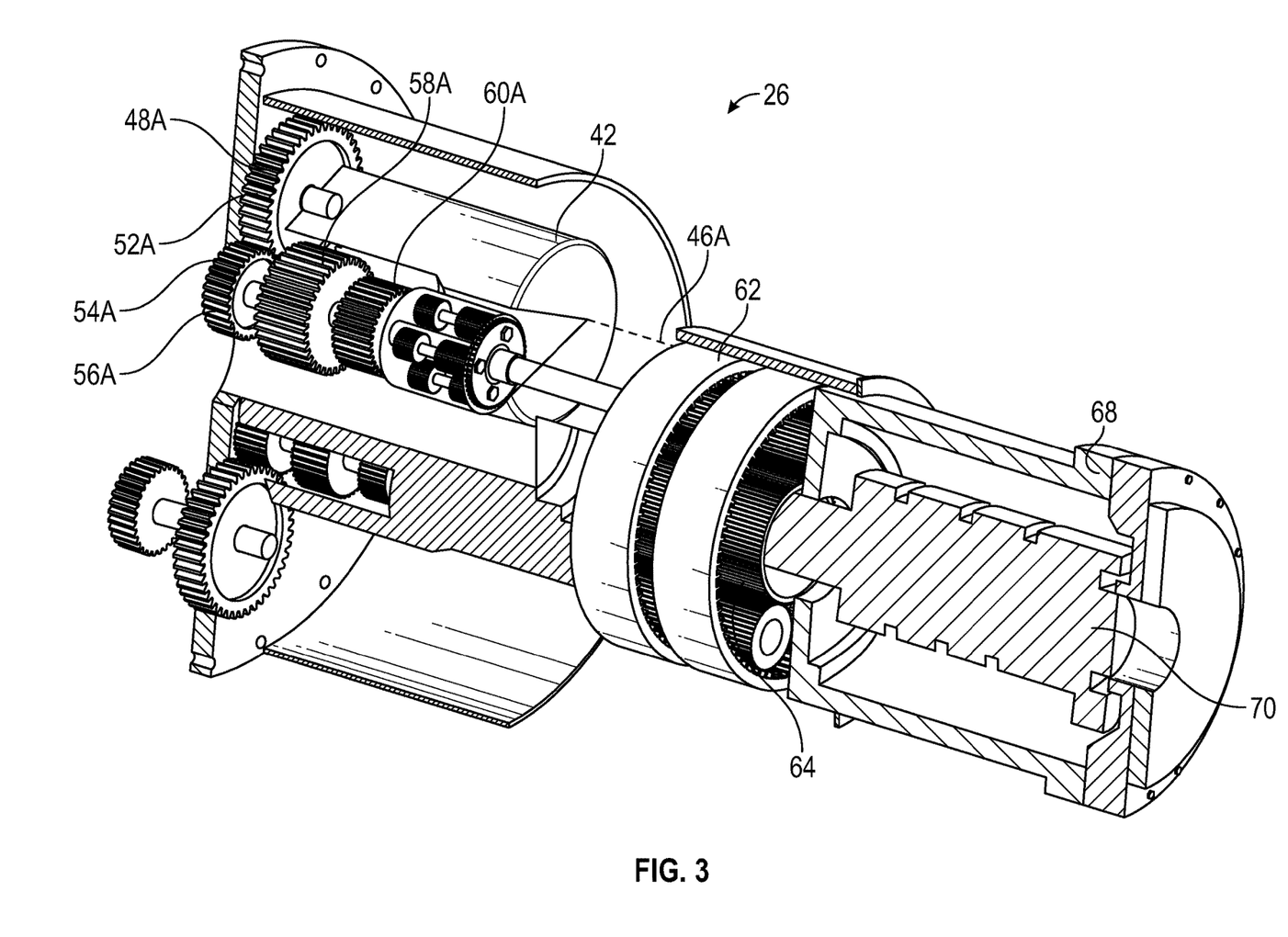
FIG. 3 is a partial sectional isometric view of an embodiment of the drive train assembly of FIG. 2, in accordance with embodiments of the present disclosure.

FIG. 3 is a detailed partial perspective view of the drive train assembly 26. It should be appreciated that certain components have been removed for clarity. As illustrated, the first motor 42 is arranged to transmit rotational movement to the first stage 48A. The first stage 48A is rotationally coupled to the second stage 54A via the external threads 50, 52. Thereafter, the third stage 58A includes the above-described planetary gear configuration and is further coupled to the fourth stage 60A. Additionally, FIG. 3 illustrates the planetary gear arrangements of the third and fourth stages 58, 60. Furthermore, the ball screw nut 68 surrounding the ball screw 70 is also illustrated. It should be appreciated that rotational movement of the balls crew nut 68 drives the ball screw 70 axially along the axis 16.

Figure 4:
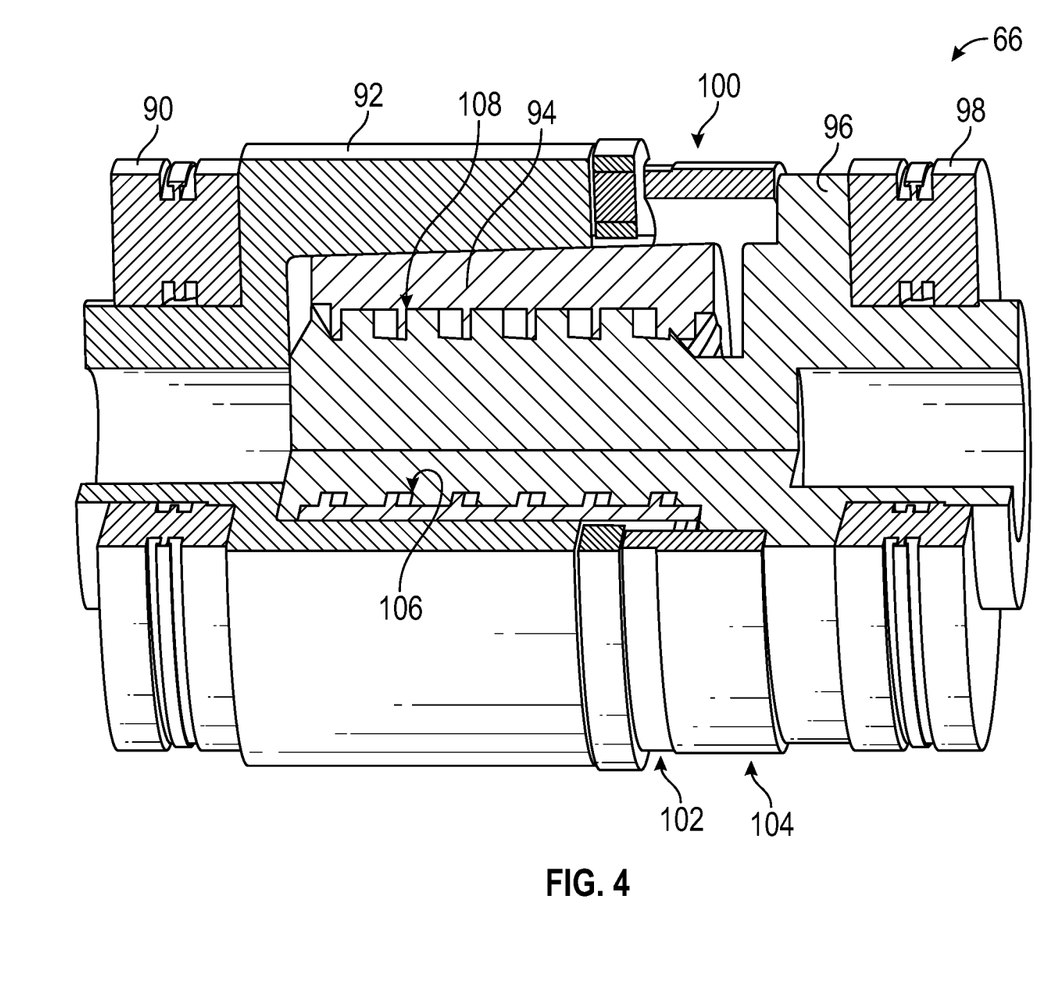
FIG. 4 is a sectional isometric side view of an embodiment of a clutch, in accordance with embodiments of the present disclosure.

FIG. 4 is a partial cut-away side perspective view of an embodiment of the clutch 66 that may be utilized with the drive train assembly 26. The illustrated clutch 66 may be referred to as a threaded cone clutch. As shown, the clutch 66 includes a bearing 90, a driven cone hub 92, a driver cone 94, a threaded part 96, a bearing 98, a friction spring 100, a spring holder 102, and a spring holder 104. The threaded part 96 is connected to the drive side through the fourth stage 60. That is, the threaded part 96 receives rotational forces from the fourth stage 60. As the threaded part 96 rotates, the threads 106 engage corresponding internal threads 108 of the driver cone 94 and move axially to drive the driver cone 94 against the driven cone hub 92. As a result, the rotation transferred to the driver cone 94 is transmitted to the driven cone hub 92. To disengage the clutch, the threaded part 96 may be driven in a reverse direction, for example a half turn that may be provided by the motors 42, 44) to disengage the driver cone 94 from the driven cone hub 92 and thereby prevent transmission of rotation back to the motor 42, 44.

Figure 5:
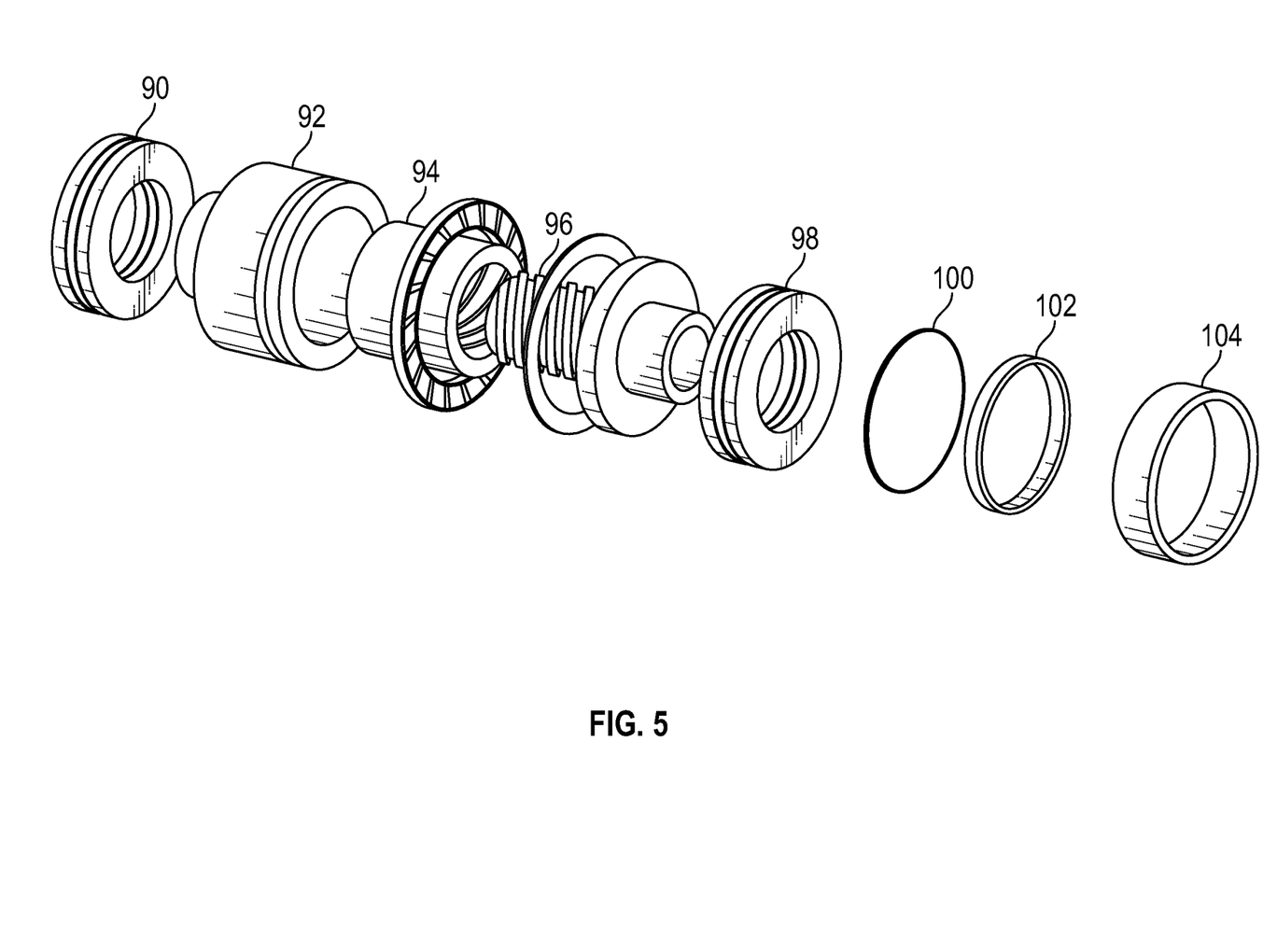
FIG. 5 is an exploded perspective view of an embodiment of the clutch of FIG. 4, in accordance with embodiments of the present disclosure.

FIG. 5 is an exploded perspective view of the clutch 66. In the illustrated embodiment, the clutch 66 is the threaded cone clutch described with reference to FIG. 4. As described above, the threaded cone clutch may be utilized to transmit rotational energy from the motors 42, 44 to the stem 18. Moreover, the illustrated threaded cone clutch may be a one-way clutch that enables transmission of rotation in one direction but prevents or blocks transmission in an opposite direction due to disengagement of one or more components. For example, when the threaded part 96 is moved in a reverse direction, which may be done by the motors 42, 44, rotational movement of the driven cone hub 92 is not transmitted to the driver cone 94 and therefore not back to the motors 42, 44.

Figure 6:
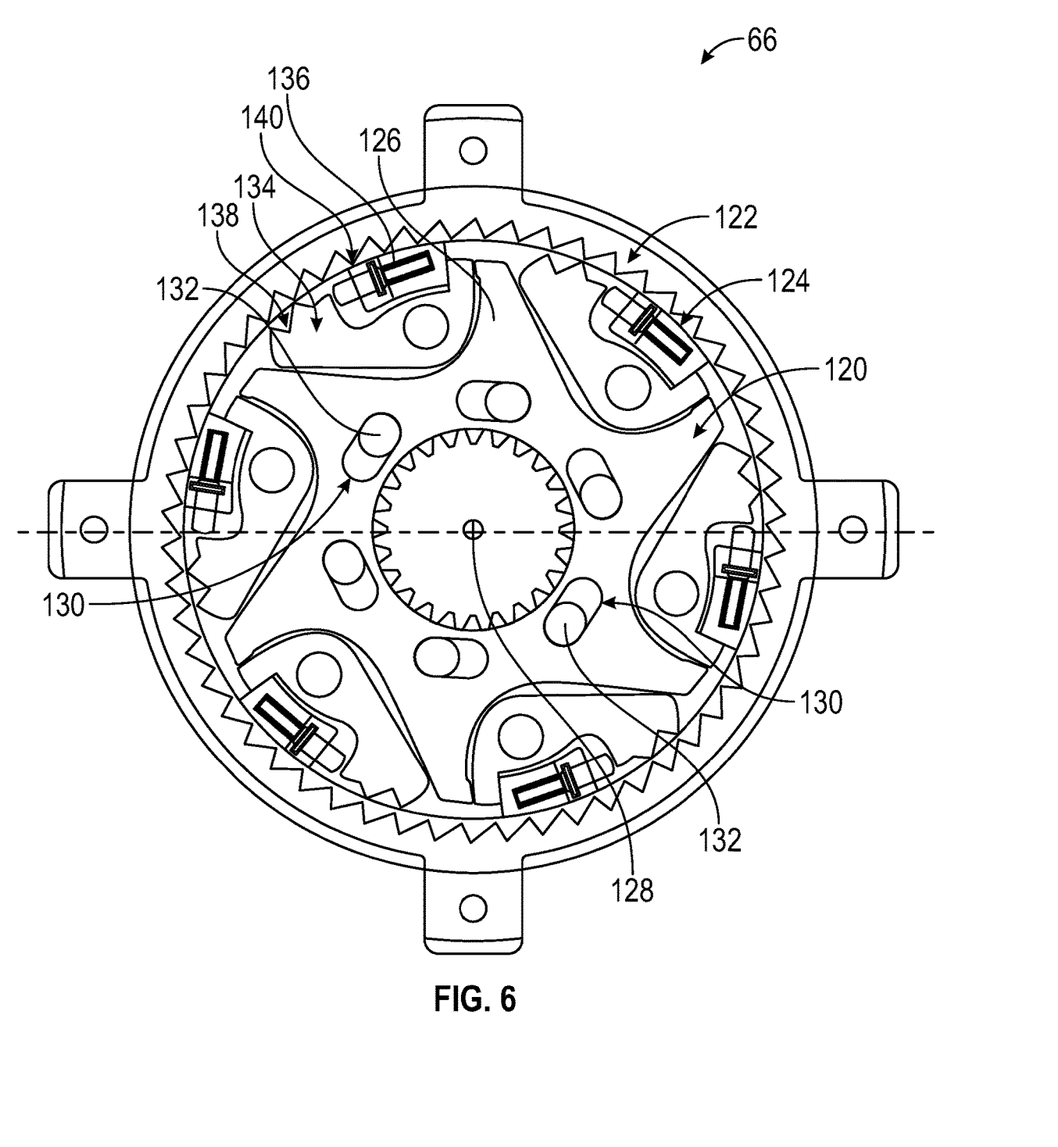
FIG. 6 is a top plan view of an embodiment of a clutch, in accordance with embodiments of the present disclosure.

FIG. 6 is a top plan view of an embodiment of the clutch 66 that may be utilized with the drive train assembly. In the illustrated embodiment, the clutch 66 is a centrifugal clutch or star clutch. As will be described below, rotation of the star clutch may drive the pawls radially outward and into engagement with a driven hub to transmit rotational movement of the star clutch to the driven hub. As shown in FIG. 6, a star drive 120 is arranged within a driven hub 122 and drive housing 124. The star drive 120 includes arms 126 positioned radially outward from an axis 128, which may be substantially aligned with the axis 16. The star drive 120 includes a plurality of pivots 130, which are elliptical shaped in the illustrated embodiment. It should be appreciated that the pivots 130 may be other shapes in certain embodiments, such as circular, arcuate, polygonal, or any other reasonable shape. Extending through the pivots 130 are pins 132 associated with the drive housing 124. As the star drive 120 rotates, the pins 132 engage the edges of the pivots 130 to facilitate rotation about the axis 128.

As shown in FIG. 6, pawl ratchets 134 are arranged about the star drive 120. The pawl ratchets 134 pivot on the drive housing 124 and are preloaded with a spring assembly 136 which drives the pawl ratchet 134 against the star drive 120. As will be described, rotational movement of the star drive 120 drives the pawl ratchets 134 outward to compress the spring assemblies 136 to facilitate coupling with the driven hub 122. Each pawl ratchet 134 includes teeth 138 that mate with corresponding teeth 140 of the driven hub 122 when the clutch 66 is in an engaged position. In the embodiment illustrated in FIG. 6, the clutch 66 is in a disengaged position. That is, the clutch 66 is not arranged to transmit rotational movement from a drive shaft to the driven portion via the clutch 66.

Figure 7:
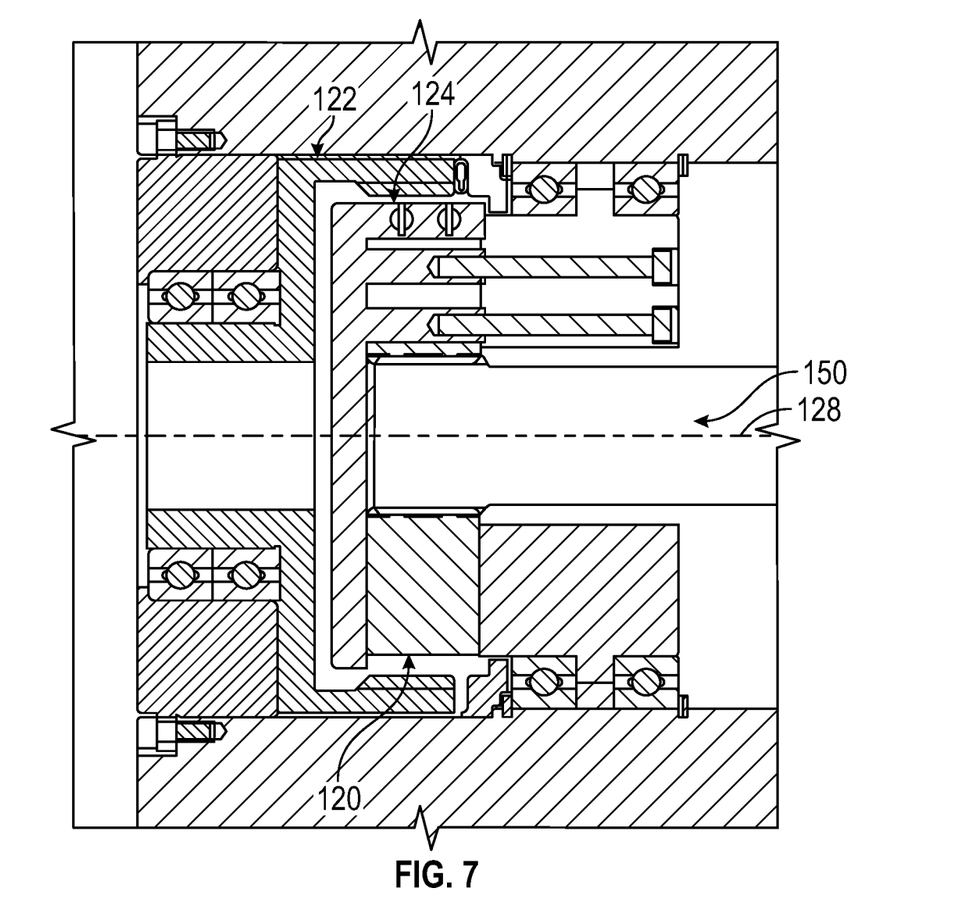
FIG. 7 is a cross-sectional side elevational view of an embodiment of the clutch of FIG. 6, in accordance with embodiments of the present disclosure.

FIG. 7 is a cross-sectional side elevational view of the clutch 66 in which the clutch 66 is the centrifugal or star clutch. As described above, in embodiments the clutch 66 may be a one-way clutch to facilitate transfer of rotational forces in a single direction. In the illustrated embodiment, the drive housing 124 is positioned within the driven hub 122. That is, the driven hub 122 circumferentially surrounds the drive housing 124. The star drive 120 is coupled to the drive housing 124 and also to a drive shaft 150, which transmits rotational forces, for example from the fourth stage 60, to the star drive 120. In the illustrated embodiment, the clutch 66 may be referred to as having a driving portion 152 and a driven portion 154. For example, the driving portion 152 receives rotational forces transmitted from the motors 42, 44 and drives the driven portion 154. However, the driven portion 154 does not transmit forces to the driving portion 152 because, as described above, the clutch 66 may be a one way clutch where the star drive 120 is disengaged, for example via a small rotation, to bring the pawl ratchets 134 out of contract with the driven hub 122.

Figure 8:
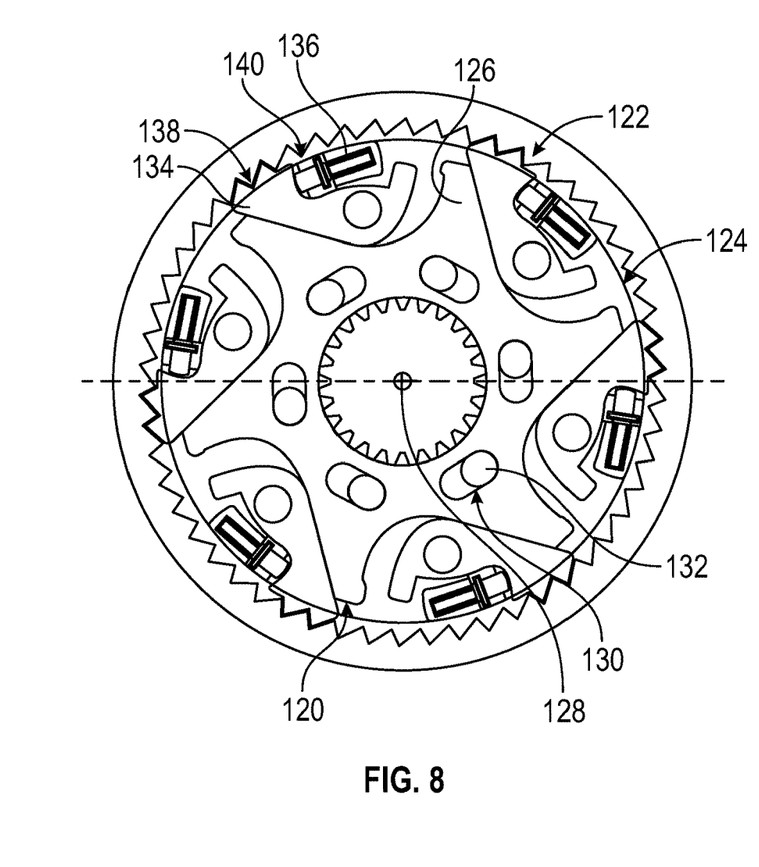
FIG. 8 is a top plan view of an embodiment of a clutch, in accordance with embodiments of the present disclosure.

FIG. 8 is a top plan view of the clutch 66 in which the clutch 66 is in the engaged position. As shown in FIG. 8, the pins 132 bear against an edge of the pivots 130 and rotational movement of the star drive 120 drives the pawl ratchets 134 into contact with the driven hub 122. As described above, the star drive 120 can move and rotate with respect to the drive housing 124 as bounded by the range of motion of the pivots 130 with respect to the pins 132. When comparing FIGS. 6 and 8, the pins 132 are against a leading edge of the pivots 130 in FIG. 6 and against a trailing edge of the pivots in FIG. 8. As a result, the star drive 120 rotates in the clockwise direction to thereby drive the pawl ratchets 134 radially outward and into engagement with the driven hub 122. It should be appreciated that the star drive 120 rotates independently within the limited rotational range bounded by the pivots 130. In this manner, rotational movement from the drive shaft 150 is translated to clutch 66 for transmission to the fifth stage 62.

The driving portion 152 and the driven portion 154 can be disengaged by disengaging the pawl ratchets 134 from the driven hub 122. Specifically, in the illustrated configuration, the drive shaft 150 can be rotated counter clockwise, which rotates the star drive 120 counter clockwise, and drive the ratchet pawls 134 out of engagement with the driven hub 122 such that the spring assembly 136 drives the ratchet pawls 134 into engagement with the star drive 120. When the star drive 120 and the driven hub 122 are disengaged, the driven portion 154 can rotate independently of the driving portion 152. Any further counter clockwise rotation will cause the driving portion 152 to rotate independently of the driven portion 154.

Figure 9:
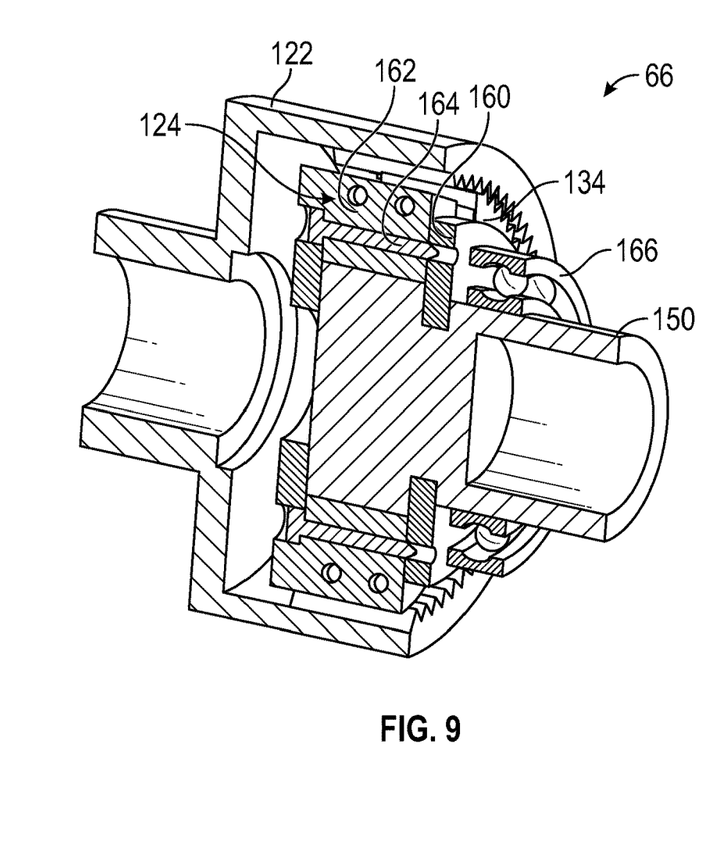
FIG. 9 is sectional isometric side view of an embodiment of a clutch, in accordance with embodiments of the present disclosure.

FIG. 9 is a sectional perspective view of an embodiment of the clutch 66, in which the clutch 66 is the star clutch illustrated in FIGS. 6-8. As illustrated, the drive housing 124 includes a housing cap 160 and a housing base 162 that may be coupled together via one or more fasteners 164. The fasteners may be screws, bolts, rivets, or any other reasonable device to couple the components together. In the illustrated embodiment, the drive shaft 150 is positioned between the housing cap 160 and the housing base 162. The drive housing 124 enables the star drive 120 and the pawl ratchets 134 to maintain their axial position and permit limited rotational movement, as described above. In certain embodiments, the clutch 66 includes a bearing 166 to facilitate rotation of the drive shaft 150. The bearings 166 maintain the position of the drive shaft 150 such that an axis of the drive shaft is substantially aligned with the axis 16. Centering the drive shaft 150 also enables proper positioning of the ratcheting pawls 134 such that a likelihood of inadvertent engagement with the driven hub 122 is reduced. In certain embodiments, the driven portion 154 may include one or more bearings to facilitate centering and positioning of the components.

Figure 10:
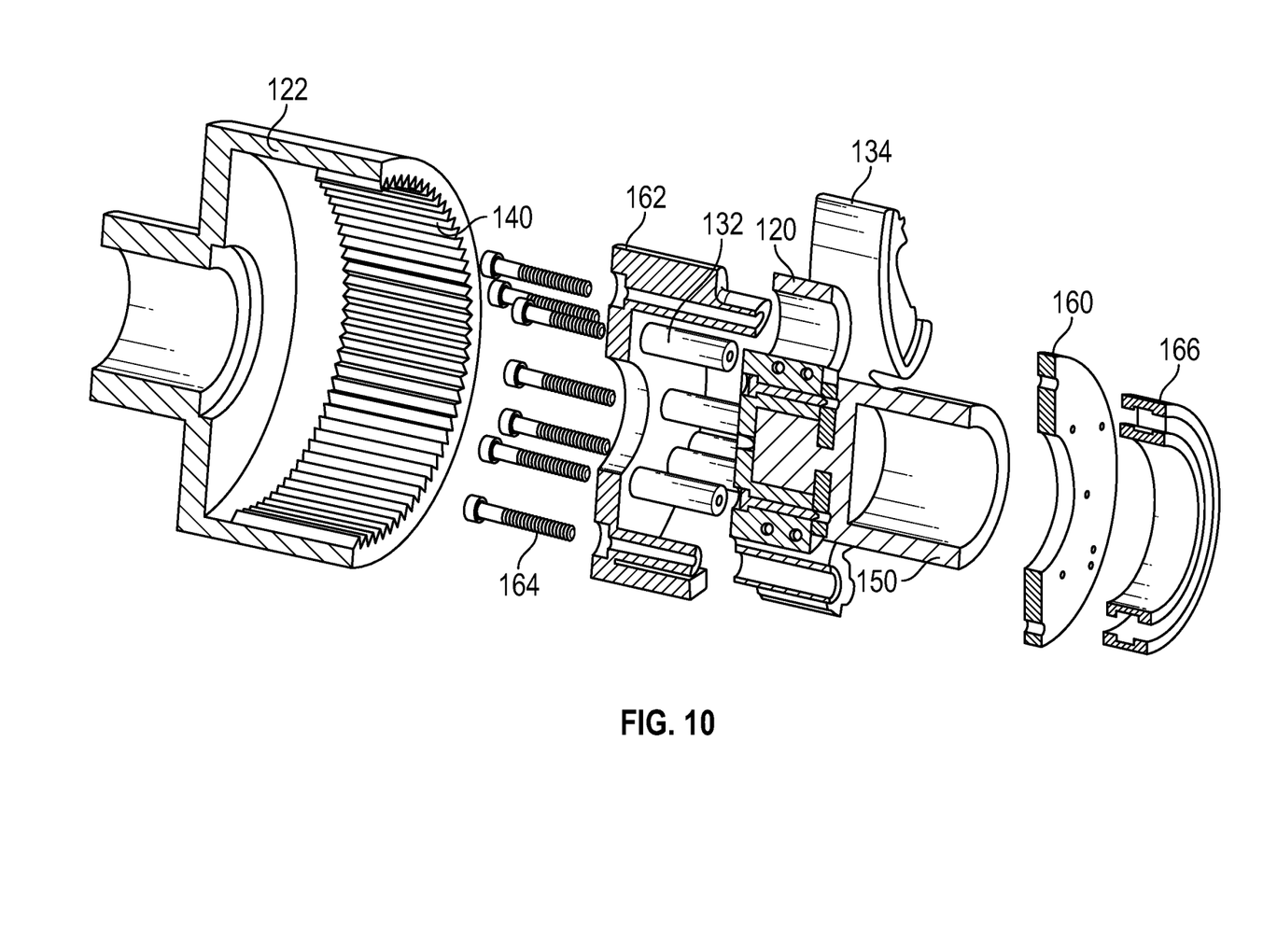
FIG. 10 is an exploded perspective view of an embodiment of the clutch of FIG. 9, in accordance with embodiments of the present disclosure.

FIG. 10 is an exploded cross-sectional perspective view of an embodiment of the clutch 66. In the illustrated embodiment, the teeth 140 of the driven hub 122 are illustrated as extending substantially circumferentially about an inner diameter of the driven hub 122. Additionally, as described above, the fasteners 164 may be utilized to couple the housing base 162 to the housing cap 160. The pins 132 are shown as extending from the housing base 162 for engagement with the star drive 120. In some embodiments, the star drive 120 and the drive shaft 150 may be formed from two separate parts and be coupled together, for example via a male-female connection. In such embodiments, the star drive 120 may have a female connection and the drive shaft 150 may have a male connector, or the star drive 120 may have a male connection and the drive shaft 150 may have a female connector. Alternatively, the star drive 120 and the drive shaft 150 may be formed integrally as one part.

In operation, when power to supplied to at least one of the motors 42, 44, the ball screw nut 68 moves the valve 10 to the open configuration by axially translating the stem 18 such that the gate 14 is moved to align the opening 22 with the bore 20. Before the valve 10 cracks open (e.g., at the initial opening), the motors 42, 44 can generate high torque at low speed to facilitate opening. As will be appreciated, the bore 20 of the valve 10 may be exposed to high pressures and therefore opening the valve 10 may require "breaking" the connection or a large force to initially being moving the gate 14. After the valve 10 begins to open, the force to continue opening the valve 10 decreases, often significantly, and the motor 42, 44 can rotate at a higher speed to complete the stroke and open the valve 10. Towards the end of the stroke, the motor 42, 44 can slow down and the brake may be activated, such as by a DC voltage supply to lock the actuator 12 in position with the fail safe spring 32 in a compressed position. The motor can then rotate in a reverse direction, for example by a partial turn, to disengage the clutch 66. In certain embodiments, an external controller regulates operation of the actuator 12, for example, regulating power to the motors 42, 44. In this manner, the torque output of the motors 42, 44 may be regulated.

During closing, for example when the power to the brake 72 is shut off or a triggering event occurs, the spring 32 provides a linear force in a reverse direction or a valve closing direction to drive the gate 14 into the bore 20. The torque generated by the ball screw nut 68 may be translated to the fifth stage 62 and the sixth stage 64 in a reverse direction than the direction the motor 42, 44 drives the various stages to open the valve. Because the clutch 66 is disengaged, the reverse rotational direction is not translated to the motors 42, 44, thereby reducing the likelihood of wear on the motor. As described above, because closing of the valve 10 may be accomplished significantly faster than opening, the torque applied to the fifth and sixth stages 62, 64 may be greater than the torque output of the motors 42, 44 and therefore isolating the motors 42, 44 is advantageous. In other words, disengaging the clutch 66 reduces inertial loading on the drive train assembly 26 during valve closing.

In certain embodiments, a dampening mechanism can also be located on the stem 18 or within the housing 30 to avoid impacts during closing operations. In certain embodiments, the dampening mechanism is a hydraulic dampening mechanism that includes a pump to adjust the level of dampening provided.

In certain embodiments, the actuator 12 described herein may be utilized to rotate a shaft instead of axially translating the stem 18 in a linear direction. In such an embodiment, the actuator 12 can consist of substantially all of the components described herein, except for the ball screw 70 and ball screw nut 68. Moreover, the spring 32 may be a wound or machined spring that can act as a torsion spring for a rotary fail safe close actuator. In other embodiments, the motors 42, 44 can include switch reluctance motors which can eliminate the clutch 66 and act as a self-damping mechanism.

Embodiments of the present disclosure provide the actuator 12 with a reduced footprint compared to hydraulic actuators due to the elimination of hydraulic power units. Furthermore, a height of the system is reduced compared to other electric actuators due to the configuration of the gear stages. Additionally, embodiments of the present disclosure describe the actuator 12 with improved reliability and longer maintenance intervals at least in part due to the redundant motors 42, 44.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for controlling movement of a valve, the system comprising:
 a valve end moveable between an open position and a closed position, wherein the valve end is within a flow bore of the valve in the closed position and substantially clear of the flow bore in the open position;
 a stem coupled to the valve end and driving movement of the valve end;
 an actuator coupled to the stem, the actuator controlling movement of the valve end via the stem, the actuator comprising:
  a motor arranged within an actuator housing, the motor providing a rotational force to drive movement of the stem;
  a driving portion including a gear drive to receive and transmit the rotational force from the motor;
  a driven portion receiving the rotational force from the driving portion, the driven portion being coupled to the stem; and
  a clutch arranged between the driving portion and the driven portion, the clutch transmitting the rotational force from the driving portion to the driven portion and being disengageble from the driven portion, wherein the clutch is a star clutch, comprising:
   a drive housing;
   a star drive rotatably coupled to the drive housing, wherein a pin coupled to the drive housing extends through a pivot of the star drive;
   a pawl ratchet positioned radially outward from the star drive, the star drive translating the pawl ratchet between an engaged position and an unengaged position; and
   a driven hub circumferentially positioned about the drive housing, wherein the pawl ratchet does not contact the driven hub in the unengaged position and contacts the driven hub in the engaged position to transmit rotation from the driving portion to the driven portion.

2. The system of claim 1, further comprising a brake arranged proximate the driving portion, the brake substantially locking a position of the stem.

3. The system of claim 2, wherein the brake is an electric brake.

4. The system of claim 1, further comprising a fail-safe spring assembly comprising:
 a spring positioned about the stem, the spring being compressed when the valve end is moved to the open position;
 wherein upon activation the spring drives the valve end toward the closed position.

5. The system of claim 1, further comprising a rotary to linear motion converter coupled to the driven portion, the rotary to linear motion converter positioned between the driven portion and the stem to convert rotary movement of the motor into linear movement of the stem.

6. The system of claim 5, wherein the rotary to linear motion converter is a ball screw having a ball screw nut coupled to the driven portion.

7. The system of claim 1, further comprising a second motor, the second motor providing a redundancy to the first motor and further being coupled to the driving portion to transmit rotational movement to the driven portion.

* * * * *